(12) United States Patent
Song et al.

(10) Patent No.: US 10,763,508 B2
(45) Date of Patent: Sep. 1, 2020

(54) BINDER FOR SECONDARY BATTERY COMPRISING A MAGNETIC MATERIAL

(71) Applicant: LG Chem, Ltd., Seoul (KR)

(72) Inventors: Jooyong Song, Daejeon (KR); Ji Hee Ahn, Daejeon (KR); Ji Eun Lee, Daejeon (KR)

(73) Assignee: LG Chem, Ltd. (KR)

( * ) Notice: Subject to any disclaimer, the term of this patent is extended or adjusted under 35 U.S.C. 154(b) by 31 days.

(21) Appl. No.: 15/736,197

(22) PCT Filed: Jul. 21, 2016

(86) PCT No.: PCT/KR2016/007936
§ 371 (c)(1),
(2) Date: Dec. 13, 2017

(87) PCT Pub. No.: WO2017/039149
PCT Pub. Date: Mar. 9, 2017

(65) Prior Publication Data
US 2018/0151883 A1    May 31, 2018

(30) Foreign Application Priority Data
Aug. 31, 2015 (KR) .......................... 10-2015-0122799

(51) Int. Cl.
*H01M 4/62* (2006.01)
*H01M 4/04* (2006.01)
(Continued)

(52) U.S. Cl.
CPC ............. *H01M 4/622* (2013.01); *H01M 4/04* (2013.01); *H01M 4/0404* (2013.01); *H01M 4/139* (2013.01); *H01M 4/621* (2013.01); *H01M 4/623* (2013.01); *H01M 4/626* (2013.01); *H01M 10/052* (2013.01); *Y02T 10/7005* (2013.01); *Y02T 10/7011* (2013.01)

(58) Field of Classification Search
CPC ...... H01M 4/622; H01M 4/04; H01M 4/0404; H01M 4/139; H01M 4/623; H01M 4/626; H01M 10/052; Y02T 10/7011
USPC .......................................................... 252/500
See application file for complete search history.

(56) References Cited

U.S. PATENT DOCUMENTS

2004/0131889 A1* 7/2004 Leddy .................... C01G 53/00
428/692.1
2010/0156290 A1 6/2010 Kim et al.
(Continued)

FOREIGN PATENT DOCUMENTS

EP 2793300 A1 10/2014
JP 2003123761 A 4/2003
(Continued)

OTHER PUBLICATIONS

International Search Report From PCT/KR2016/007936 dated Oct. 12, 2016.

*Primary Examiner* — Katie L. Hammer
(74) *Attorney, Agent, or Firm* — Lerner, David, Littenberg, Krumholz & Mentlik, LLP

(57) ABSTRACT

The present invention provides a binder for secondary battery contained in an electrode mixture, comprising a binder molecule exhibiting an adhesion to a current collector and active material particles, and a magnetic material displaying magnetism for a magnetic field applied from outside.

5 Claims, 2 Drawing Sheets

(51) Int. Cl.
*H01M 10/052* (2010.01)
*H01M 4/139* (2010.01)

(56) References Cited

U.S. PATENT DOCUMENTS

| | | | |
|---|---|---|---|
| 2011/0195310 A1* | 8/2011 | Kawamoto | H01M 4/131 |
| | | | 429/231.3 |
| 2012/0088148 A1 | 4/2012 | Leddy et al. | |
| 2013/0177792 A1 | 7/2013 | Takahata et al. | |
| 2013/0323541 A1* | 12/2013 | Mizuno | H01M 4/8828 |
| | | | 429/10 |

FOREIGN PATENT DOCUMENTS

| | | | | |
|---|---|---|---|---|
| JP | 2006252945 | A | | 9/2006 |
| JP | 2014007037 | A | * | 1/2014 |
| JP | 2014007037 | A | | 1/2014 |
| KR | 20090126356 | A | | 12/2009 |
| KR | 20100071773 | A | | 6/2010 |
| KR | 20100074945 | A | | 7/2010 |
| KR | 20120033135 | A | | 4/2012 |
| KR | 101423779 | B1 | | 7/2014 |
| KR | 20150024703 | A | | 3/2015 |

* cited by examiner

BINDER FOR SECONDARY BATTERY COMPRISING A MAGNETIC MATERIAL

CROSS-REFERENCE TO RELATED APPLICATION(S)

This application is a national phase entry under 35 U.S.C. § 371 of International Application No. PCT/KR2016/007936, filed Jul. 21, 2016, which claims priority to Korean Patent Application No. 10-2015-0122799 filed Aug. 31, 2015, the disclosures of which are incorporated herein by reference.

TECHNICAL FIELD

The present invention relates to a binder for secondary battery comprising a magnetic material.

BACKGROUND

In recent years, in line with an increase in the price of energy sources due to the depletion of fossil fuels and amplification of interests in environmental pollution, environmentally-friendly alternative energy sources has become an indispensable element for future life. Thus, research into various power generation technologies using nuclear power, solar power, wind power, tidal power, etc. has continuously conducted, and great interests in power storage devices for more efficiently using the energy thus generated have also grown.

In particular, as mobile devices have been continuously developed and the demand for such mobile devices has increased, the demand for secondary batteries has also sharply increased as an energy source for such mobile devices. Accordingly, much research into batteries satisfying various needs has been carried out.

Typically, in terms of the shape of batteries, the demand for prismatic secondary batteries or pouch-shaped secondary batteries that are thin enough to be applied to products, such as cellular phones, is very high. In terms of the material for batteries, on the other hand, the demand for lithium secondary batteries, such as lithium ion batteries and lithium ion polymer batteries, which exhibit high energy density, discharge voltage, and output stability, is also very high.

In addition, the secondary battery may be classified based on the structure of an electrode assembly, which has a structure in which a positive electrode, a negative electrode, and a separator interposed between the positive electrode and the negative electrode are stacked. Representative examples of such an electrode assembly include a jelly-roll type (winding type) electrode assembly in which long-sheet type positive electrodes and long-sheet type negative electrodes coated with an active material are wound in the state in which a separator is interposed between the positive electrode and the negative electrode, and a stack type (laminating type) electrode assembly in which a plurality of positive electrodes and negative electrodes, each of which are cut in units of a predetermined size, are sequentially stacked in the state in which a plurality of separators is interposed respectively between the positive electrodes and the negative electrodes. In recent years, in order to solve the problems with the jelly-roll type electrode assembly and the stack type electrode assembly, there has been developed a stacked/folded type electrode assembly, which is a combination of the jelly roll type electrode assembly and the stacked type electrode assembly, having an improved structure in which a predetermined number of positive electrodes and a predetermined number of negative electrodes are sequentially stacked in the state in which a predetermined number of separators are disposed respectively between the positive electrodes and the negative electrodes to constitute a unit cell, after which a plurality of unit cells is sequentially wound in the state of being placed on a separation film.

In addition, the secondary battery may be classified according to the shape of the battery into a cylindrical battery or a prismatic battery in which an electrode assembly is built in a cylindrical or rectangular metal container, and a pouch-typed battery in which an electrode assembly is built in a pouch-shaped case made of an aluminum laminate sheet.

In particular, in recent years, a pouch-typed battery having a structure in which a stack-typed or a stack/folding typed electrode assembly is built in a pouch-typed battery case made of an aluminum laminate sheet has attracted a great deal of attention due to low manufacturing cost, small weight, easy morphological deformation, etc., and its usage is also gradually increasing.

In general, such a secondary battery is manufactured by coating an electrode mixture comprising an electrode active material, a conductive agent, a binder, etc., onto an electrode current collector, and drying the coated collector to prepare an electrode, laminating the electrode together with a separator, enclosing the electrode together with an electrolytic solution in a battery case, and then sealing the case.

FIG. 1 is a schematic view showing a manufacturing process of a conventional positive electrode for a secondary battery.

Referring to FIG. 1, the positive electrode 100 is formed by a process in which the positive electrode mixture 110 including positive electrode active material particles 111 and binders 112 is coated in a liquid state onto a top surface of an positive electrode current collector 120, and then dried 130.

Here, in the drying process 130 for the positive electrode mixture 110, a solvent contained in the positive electrode mixture 110 is dried 130, and the binder 112 is contained in the positive electrode mixture 110 in a state of being dissolved in the solvent. Therefore, in the process of drying the solvent, the binder 112 dissolved in the solvent is transferred to the upper portion of the negative electrode mixture 110.

Accordingly, a relatively small amount of binder component is disposed between the positive electrode mixture 110 and the positive electrode current collector 120, thereby lowering the adhesive force between the positive electrode mixture 110 and the positive electrode current collector 120, and also increasing the resistance of the positive electrode 100. Therefore, there is a problem that the structural stability and electrical performance of the secondary battery including the positive electrode 100 are deteriorated.

Further, these problems act as factors that increase the fraction defective in the electrode manufacturing process, lower the reliability of the electrode manufacturing process, delay the overall process time and thus increase the manufacturing cost.

Therefore, there is a high need for a technology capable of fundamentally solving such a problem.

Technical Problem

The present invention has been made to solve the above-described problems and technical problems encountered with the prior arts.

The present inventors have conducted a variety of extensive and intensive studies and experiments, and found that, as a binder for secondary battery is configured to include, together with a binder molecule, a magnetic material displaying magnetism for a magnetic field applied from outside as described later, in the drying process of an electrode mixture coated onto one surface of an current collector, the binder containing the magnetic material can be transferred by the drying of the solvent through an magnetic field applying unit disposed on a surface opposite to the current collector to face against it, thereby preventing a phenomenon in which the binder is transferred in the upper direction of the electrode mixture, increasing the adhesive force of the electrode mixture to the electrode current collector, improving the structural stability of the electrode, preventing the resistance increase of the electrode, and preventing the electrical performance degradation of the electrode, lowering the defect rate of the product and thus improving the reliability of the process. The present invention has been completed on the basis of such finding.

Technical Solution

In accordance with one aspect of the present invention, the above and other objects can be accomplished by the provision of a binder for secondary battery which is a binder for secondary battery contained in an electrode mixture, the binder comprising:

a binder molecule exhibiting an adhesion to a current collector and an active material particle; and a magnetic material displaying magnetism for a magnetic field applied form outside.

Therefore, in the drying process of an electrode mixture coated onto one surface of an current collector, the binder containing the magnetic material can be transferred by the drying of the solvent through a magnetic field applying unit disposed on a surface opposite to the current collector to face against it, thereby preventing a phenomenon in which the binder is disposed in the upper direction of the electrode mixture, increasing the adhesive force of the electrode mixture to the electrode current collector, improving the structural stability of the electrode, preventing the resistance increase of the electrode, and preventing the electrical performance degradation of the electrode, lowering the defect rate of the product and thus improving the reliability of the process.

In one embodiment of the present invention, the magnetic material may be a metal, specifically at least one selected from the group consisting of Al, Mg, Ni, Co, Fe, Cr, V, Ti, Cu, Zn, Zr, Nb, Mo, Sr, Sb, W and Ti.

However, the type of the magnetic material is not limited thereto. The type of the magnetic material is not particularly limited as long as the magnetic material displays magnetism for a magnetic field applied from outside and does not affect the performance of the electrode.

The magnetic material may be contained in an amount ranging from 0.1% to 20% by weight based on the total weight of the binder.

If the magnetic material is contained in an amount of less than 0.1% based on the total weight of the binder, the content of the magnetic material may be too small to exhibit a desired effect. On the contrary, if the magnetic material is contained in an amount of more than 20% based on the total weight of the binder, the content of other components including the electrode active material is excessively reduced as compared with the electrode mixture of the same weight, resulting in a reduction in the electrical performance of the electrode.

Meanwhile, the magnetic material may have a structure that is chemically bonded to the binder molecule.

In this case, the magnetic material may have a structure in which it is bonded to a binder molecule in the form of ions.

Further, the magnetic material may have a structure that is bonded to the binder molecules by ionic bonds, covalent bonds or coordinate bonds.

Accordingly, the magnetic material is bonded to the binder molecules with a strong binding force, and the binder molecules bonded to the magnetic material having a predetermined magnetism for a magnetic field applied from outside are also fixed or transferred toward the current collector, thereby preventing deterioration of adhesive force of the mixture.

In particular, the binder molecule may contain at least one anion substituent group, the magnetic material may be composed of a cationic metal, and the binder molecule and the magnetic material may have a structure that forms a chelate bond.

As used herein, the 'chelate bond' means a bond of a compound having a cyclic structure having two or more coordination atoms in one molecule or ion and also being coordinated as if it surrounds a metal atom or an ion. In general, when the metal constituting the magnetic material exists in the form of an ion, it forms a cation, and correspondingly, the binder molecule contains at least one anion substituent group.

Accordingly, the binder molecule may have a structure that forms a chelate bond with a magnetic metal ion via an anion substituent group, and thus the binder molecule is disposed in the direction of the electrode collector together with the metal displaying magnetism for the magnetic field applied from outside, thereby exhibiting the desired effect.

In addition, the types of the binder molecule are not particularly limited as long as the binder molecule can chemically bond with the magnetic material and exhibit the adhesive force to the current collector and the active material particles. Specifically, the binder molecule may include at least one selected from the group consisting of polyvinylidene fluoride, polyvinyl alcohol, carboxymethylcellulose (CMG), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, and fluorine rubber, or a copolymer thereof.

Further, the present invention provides an electrode mixture for secondary battery comprising a binder for secondary battery, wherein the electrode mixture may be a positive electrode mixture or a negative electrode mixture.

That is, the binder for secondary battery according to the present invention can be applied to both the positive electrode mixture and the negative electrode mixture regardless of the polarity of the electrode mixture.

In addition, the present invention provides an apparatus for coating the electrode mixture on an electrode current collector, the apparatus comprising:

a conveying unit for conveying the current collector in one direction;

an electrode mixture coating unit for coating an electrode mixture onto one surface of the current collector;

a drying unit for drying the electrode mixture coated onto the current collector; and a magnetic field applying unit applying an external magnetic field to the electrode mixture coated onto one surface of the current collector.

In this case, the magnetic field applying unit may have a structure that is disposed at a drying unit, or a conveying unit and a drying unit at the other surface opposite to the one surface of the current collector. Accordingly, the binder of the electrode mixture may be disposed in a direction adjacent to the magnetic field applying unit on one surface of the current collector.

As described above, the electrode mixture may have a structure that is coated onto one surface of the current collector.

Therefore, the magnetic field applying unit can be disposed on the other surface opposite to the one surface of the current collector, so that the external magnetic field can be applied to the electrode mixture, and thereby the magnetic material of the binder included in the electrode mixture can display magnetism for the external magnetic field. Thereby, it is possible to prevent the binder containing the magnetic material from transferring upward together with the solvent to be dried. Accordingly, the binder is disposed in a direction adjacent to the magnetic field applying unit on one surface of the current collector by magnetic force, so that the adhesive force between the electrode mixture and the current collector can be improved.

Further, when the electrode mixture is coated onto one surface of the current collector, the binder and the active material are uniformly distributed, whereby the magnetic field applying unit is disposed in the drying unit in which the movement of the binder is relatively easy, or in the conveying unit including the drying unit, so that the effect of the present invention can be maximized.

In one embodiment, the intensity of the external magnetic field applied by the magnetic field applying unit may be 0.05 T (Tesla) to 100 T.

If the intensity of the external magnetic field applied by the magnetic field applying unit is too low beyond the above range, the desired effect of improving the adhesion may not be exhibited. On the other hand, if the intensity is too high, it may interfere with the uniform mixing of the electrode mixture and affect the electrical performance of other components contained in the electrode mixture.

On the other hand, the present invention provides a battery cell manufactured by using the apparatus for coating the electrode mixture. The type of the battery cell is not particularly limited, but specific examples of the battery may include a lithium secondary battery such as a lithium ion battery or a lithium ion polymer battery, etc., which has advantage properties such as high energy density, discharge voltage, and output stability.

In general, a lithium secondary battery is composed of a positive electrode, a negative electrode, a separator, and a non-aqueous electrolyte solution containing a lithium salt.

The positive electrode is prepared, for example, by coating a mixture of an positive electrode active material, a conductive material and a binder on a positive electrode current collector, followed by drying and, if necessary, further adding a filler to the mixture.

Examples of the positive electrode active material include a layered compound such as lithium cobalt oxide ($LiCoO_2$), lithium nickel oxide ($LiNiO_2$), to etc., or a compound substituted with one or more transition metals; lithium manganese oxides such as $Li_{1+x}Mn_{2-x}O_4$ (wherein x is 0 to 0.33), $LiMnO_3$, $Li_2MnO_3$, $LiMnO_2$, etc.; lithium copper oxide ($Li_2CuO_2$); vanadium oxides such as $LiV_3O_8$, $LiFe_3O_4$, $V_2O_5$, $Cu_2V_2O_7$, etc.; Ni-site type lithium nickel oxides having the formula $LiNi_{1-x}M_xO_2$ (wherein M=Co, Mn, Al, Cu, Fe, Mg, B or Ga and x=0.01 to 0.3); lithium manganese composite oxide having the formula $LiMn_{2-x}M_xO_2$ (wherein M=Co, Ni, Fe, Cr, Zn or Ta, and x=0.01~0.1) or $Li_2Mn_3MO_8$ (wherein M=Fe, Co, Ni, Cu or Zn); $LiMn_2O_4$ wherein a part of Li in the formula is substituted with an alkaline earth metal ion; disulfide compounds; $Fe_2(MoO_4)_3$, and the like, but are not limited thereto.

The conductive material is usually added in an amount of 1% to 30% by weight based on the total weight of the mixture containing the positive electrode active material. Such a conductive material is not particularly limited as long as it has electrical conductivity without causing chemical changes in the battery. Examples of the conductive material used in the present invention include graphite such as natural graphite or artificial graphite; carbon blacks such as carbon black, acetylene black, Ketjen black, channel black, furnace black, lamp black, summer black, etc.; conductive fibers such as carbon fibers, metal fibers, etc.; metal powders such as carbon fluoride, aluminum, and nickel powder, etc.; conductive whiskers such as zinc oxide, potassium titanate, etc.; conductive metal oxides such as titanium oxide; conductive materials such as polyphenylene derivatives, and the like.

The filler is optionally used as a component for suppressing the expansion of the positive electrode, and is not particularly limited as long as it is a fibrous material without causing chemical change in the battery. Examples of the filler include olefin-based polymers such as polyethylene, polypropylene, etc.; and fibrous materials such as glass fibers and carbon fibers, etc.

The negative electrode is prepared by coating a negative electrode active material onto a negative electrode current collector followed by drying, and if necessary, may optionally further include the components as described above.

Examples of the negative electrode active material used in the present invention include carbon such as non-graphitized carbon and graphite carbon; metal composite oxides such as $Li_xFe_2O_3$ (0≤x≤1), $Li_xWO_2$ (0≤x≤1), $Sn_xMe_{1-x}Me'_yO_z$ (wherein Me is Mn, Fe, Pb, or Ge; Me' is Al, B, P, Si, elements of Groups 1, 2, 3 of the periodic table, or halogen atom; 0≤x≤1; 1≤y≤3; 1≤z≤8), etc.; lithium metal; lithium alloy; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$, etc.; conductive polymers such as polyacetylene; Li—Co—Ni-based materials, and the like.

The separator and the separation film are interposed between the positive electrode and the negative electrode, and an insulating thin film having high ion permeability and mechanical strength is used. The pore diameter and the thickness of the separator are generally 0.01 to 10 μm, and 5 to 120 μm, respectively. As such a separator, for example, a sheet or a nonwoven fabric made of an olefin-based polymer which is chemically resistant and hydrophobic, glass fiber, polyethylene or the like is used. When a solid electrolyte such as a polymer is used as the electrolyte, the solid electrolyte may also serve as a separator.

Further, in one specific example, in order to improve the safety of the battery, the separator and/or the separation film may be an organic/inorganic composite porous SRS (Safety-Reinforcing Separators) separator.

The SRS separator is produced by using inorganic particles and a binder polymer on a polyolefin-based separator base substance as an active layer component, wherein the separator has a uniform pore structure formed by the interstitial volume among the inorganic particles, which are the active layer components, together with the pore structure contained in the separator substrate itself.

The use of such an organic/inorganic composite porous separator has the advantage of suppressing an increase in thickness of the cell due to swelling at the time of formation, compared to the case where a conventional separator is used, and the separator may be used as an electrolyte when a polymer capable of gelation is used in the impregnation of the binder polymer component with a liquid electrolyte.

In addition, since the organic/inorganic composite porous separator can exhibit excellent adhesion properties by controlling the contents of the inorganic particles and the binder polymer in the separator, the process for assembling a battery can be easily performed.

The inorganic particles are not particularly limited as long as they are electrochemically stable. That is, the inorganic particles used in the present invention are not particularly limited as long as oxidation and/or reduction reaction does not occur in the operating voltage range of the applied battery (for example, 0 to 5 V based on Li/Li+). In particular, when inorganic particles having an ion-transferring ability are used, the ionic conductivity in the electrochemical device can be increased to improve the performance, so that inorganic particles having ion conductivity as high as possible are preferable. In addition, when the inorganic particles have a high density, they are difficult to disperse at the time of coating, and there is also a problem of an increase in weight in the production of a battery. Accordingly, it is preferable that the inorganic particles have as small a density as possible. Further, in case the inorganic substance having a high dielectric constant, it contributes to an increase in the dissociation of an electrolyte salt, for example, a lithium salt in the liquid electrolyte, so that the ion conductivity of the electrolytic solution can be improved.

The non-aqueous electrolyte solution containing a lithium salt is composed of a polar organic electrolytic solution and a lithium salt. As the electrolytic solution, a non-aqueous liquid electrolytic solution, an organic solid electrolyte, an inorganic solid electrolyte, etc. are used.

As the non-aqueous liquid electrolytic solution, for example, the following aprotic organic solvents may be used: N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxy franc, 2-methyltetrahydrofuran, dimethylsulfoxide, 1,3-dioxolane, formamide, dimethylformamide, dioxolane, acetonitrile, nitromethane, methyl formate, methyl acetate, triester phosphate, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate, ethyl propionate, and the like.

As the organic solid electrolyte, for example, the following polymers may be used: polyethylene derivative, polyethylene oxide derivative, polypropylene oxide derivative, phosphate ester polymer, polyagitation lysine, polyester sulfide, polyvinyl alcohol, polyvinylidene fluoride, polymer including an ionic dissociation group, and the like.

As the inorganic solid electrolyte, for example, the following compounds may be used: nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc.

The lithium salt may be dissolved in the non-aqueous electrolyte. As the lithium salt, for example, the following compounds may be used: $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carboxylate, lithium 4-phenylborate, imide and the like.

For the purpose of improving the charge-discharge characteristics and the flame retardancy, the non-aqueous electrolytic solution may include, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxyethanol, aluminum trichloride and the like. If necessary, a halogen-containing solvent such as carbon tetrachloride, ethylene trifluoride or the like may be further added to impart nonflammability, or a carbon dioxide gas may be further added to improve high-temperature storage characteristics.

The present invention also provides a device comprising one or more of the battery cells. Examples of the device include a mobile phone, a tablet computer, a notebook computer, a power tool, a wearable electronic device, an electric vehicle, a hybrid electric vehicle, a plug-in hybrid electric vehicle, and an electric power storage device.

Since the devices are well known in the art, a detailed description thereof will be omitted herein.

DETAILED DESCRIPTION OF THE EMBODIMENTS

Hereinafter, the present invention will be described in detail with reference to the drawings according to the embodiments of the present invention, but the scope of the present invention is not limited thereto.

Figure 1:
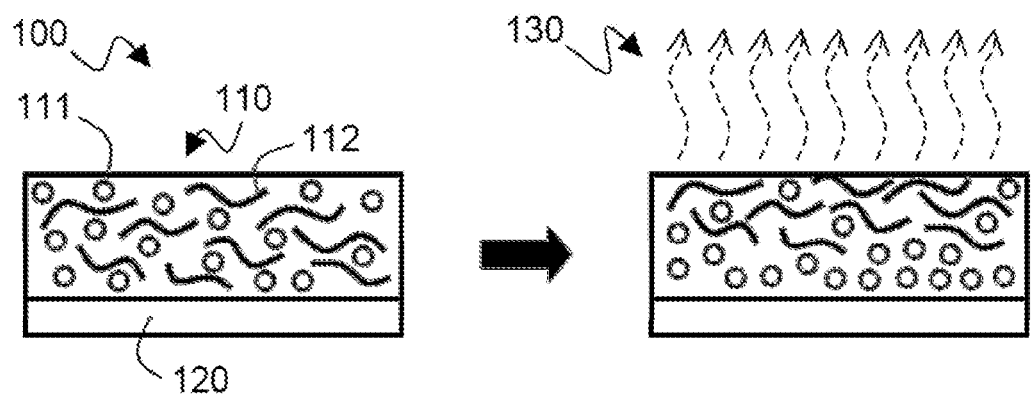
FIG. 1 is a schematic view showing a manufacturing process of a conventional positive electrode for a secondary battery.
Figure 2:
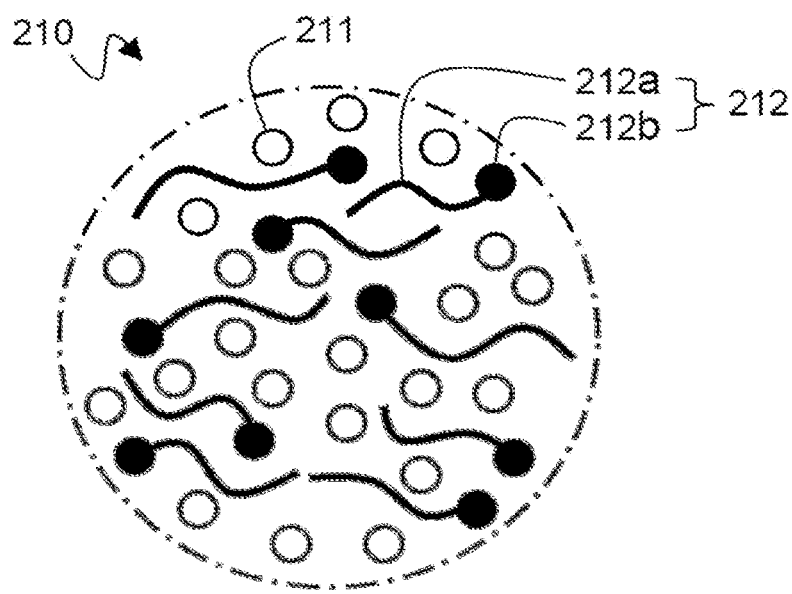
FIG. 2 is a schematic view showing a configuration of a positive electrode mixture including a binder for secondary battery according to an embodiment of the present invention.

FIG. 2 is a schematic view showing a configuration of a positive electrode mixture including a binder for secondary battery according to an embodiment of the present invention.

Referring to FIG. 2, the positive electrode mixture 210 comprises positive electrode active material particles 211 and binders 212.

The binder 212 includes a binder molecule 212a exhibiting an adhesion to the current collector and the positive electrode active material particles 211, and a magnetic material 212b chemically bonded to the binder molecule 212a.

The magnetic material 212b displays magnetism for a magnetic field applied from outside, and a magnetic field applying unit for applying the external magnetic field is disposed on the other surface opposite to one surface of the current collector on which the positive electrode mixture 210 is coated. Accordingly, the magnetic material 212b is disposed on one side of the current collector coated with the positive electrode mixture 210 toward the direction adjacent to the magnetic field applying unit. Therefore, it is possible to prevent the chemically bonded binder molecules 212a from transferring in the upward direction of the positive electrode mixture 210 together with the solvent during the drying process.

Figure 3:
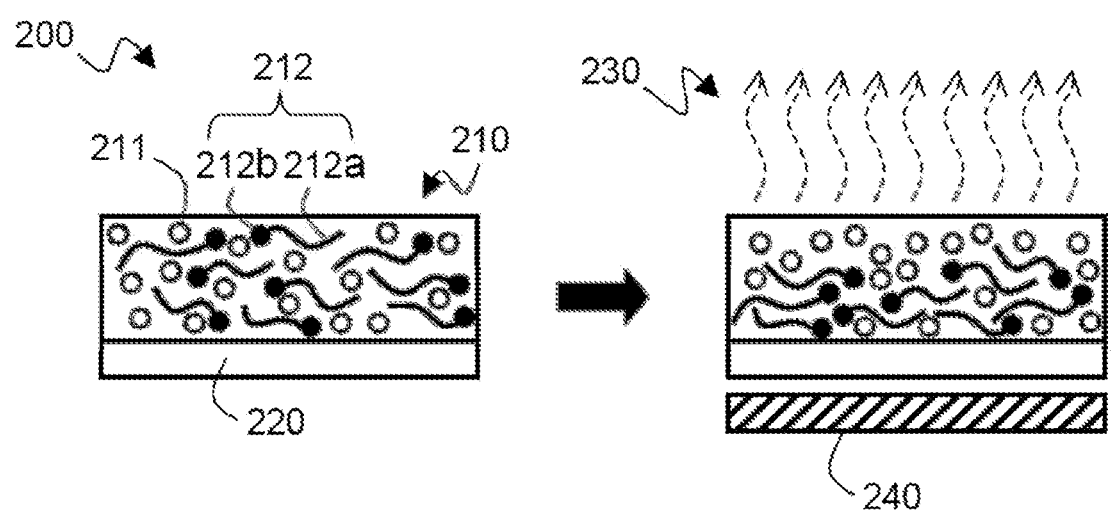
FIG. 3 is a schematic view showing a process of coating the positive electrode mixture of FIG. 2 on a current collector.

FIG. 3 is a schematic view showing a process of coating the positive electrode mixture of FIG. 2 onto a current collector.

Referring to FIG. 3, the positive electrode 200 is manufactured by coating a positive electrode mixture 210 including positive electrode active materials 211 and binders 212 in a state of liquid on a top surface of an positive electrode current collector 220, and then drying the same.

The magnetic field applying unit 240 for applying an external magnetic field is positioned on the other surface opposite to one surface of the positive electrode current collector 220 coated with the positive electrode mixture 210 in the drying process 230 of the positive electrode mixture 210.

Thus, the magnetic material 212b displays magnetism for an external magnetic field applied from the magnetic field applying unit 240, and disposed on one side of the current collector 220 toward the direction adjacent to the magnetic field applying unit 240.

Therefore, it is possible to prevent the binder molecules 212a chemically bonded to the magnetic material 212b from transferring in the upward direction of the positive electrode mixture 210 during the drying process of the solvent, and improve the adhesion of the positive electrode mixture 210 to the positive electrode current collector 220.

It will be apparent to those skilled in the art that various modifications and variations can be made on the basis of the description without departing from the spirit and scope of the present invention.

As described above, as a binder for secondary battery includes, together with a binder molecule, a magnetic material displaying magnetism for a magnetic field applied from outside, in the drying process of an electrode mixture coated onto one surface of an current collector, the binder containing the magnetic material can be transferred by the drying of the solvent through an magnetic field applying unit disposed on a surface opposite to the current collector to face against it, thereby preventing a phenomenon in which the binder is transferred in the upper direction of the electrode mixture, increasing the adhesive force of the electrode mixture to the electrode current collector, improving the structural stability of the electrode, preventing the resistance increase of the electrode, and preventing the electrical performance degradation of the electrode, lowering the defect rate of the product and thus improving the reliability of the process.

The invention claimed is:

1. A binder for secondary battery contained in the electrode mixture, the binder comprising:
    a binder molecule exhibiting an adhesion to a current collector and active material particles; and
    a magnetic material displaying magnetism for a magnetic field applied from outside,
    wherein the magnetic material is a cationic metal,
    wherein the metal is at least one selected from the group consisting of Al, Mg, Ni, Co, Fe, Cr, V, Ti, Cu, Zn, Zr, Nb, Mo, Sr, Sb, W and Ti,
    wherein the magnetic material is chemically bonded to the binder molecule,
    wherein the binder molecule and the magnetic material forms a chelate bond, and
    wherein the binder molecule is at least one selected from the group consisting of polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, and fluorine rubber, or a copolymer thereof.

2. The binder for secondary battery according to claim 1, wherein the magnetic material is contained in an amount of 0.1% to 20% by weight based on the total weight of the binder.

3. An electrode mixture for secondary battery, comprising an electrode active material, and the binder of claim 1.

4. An electrode comprising a positive electrode active material and the binder of claim 1.

5. A secondary battery comprising a separator, a non-aqueous electrolyte, and the electrode of claim 4.

* * * * *